C. C. HANSEN.
VALVE FOR PERCUSSIVE TOOLS.
APPLICATION FILED DEC. 27, 1912.

1,068,649.

Patented July 29, 1913.

2 SHEETS—SHEET 1.

WITNESSES:
John A. Mock
R. J. Day.

INVENTOR
Charles C. Hansen
BY
Philip Burwell Goode
ATTORNEY

C. C. HANSEN.
VALVE FOR PERCUSSIVE TOOLS.
APPLICATION FILED DEC. 27, 1912.

1,068,649.

Patented July 29, 1913.
2 SHEETS—SHEET 2.

WITNESSES:
John S. Mock
R. J. Day

INVENTOR
Charles C. Hansen
BY
Philip Burnwell Goode
ATTORNEY

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

VALVE FOR PERCUSSIVE TOOLS.

1,068,649.

Specification of Letters Patent. Patented July 29, 1913.

Application filed December 27, 1912. Serial No. 738,786.

*To all whom it may concern:*

Be it known that I, CHARLES C. HANSEN, a citizen of the United States, residing at Easton, in the county of Northampton and State of Pennsylvania, have invented a certain new and useful Improvement in Valves for Percussive Tools, of which the following is a specification.

This invention relates to percussive tools and more particularly to a valve motion for such tools of the type wherein the inlet ports of the tool are controlled by a valve whose movement is effected by compression generated in the ends of the cylinder and exerted on opposed surfaces of the valve through the inlet passages. Heretofore when valves of this type have been constructed to control the exhaust passages from the cylinder also, a single valve only has been used, having additional portions to control the exhaust passages thus making the valve more difficult to throw by compression and also limiting the movement of the portion controlling the exhaust passages to that of the inlet passage controlling portion. In a valve of this type it is desirable to have the movement of the inlet controlling portion, which is thrown by compression from the cylinder, as small as possible and, as the volume of the fluid exhausted from the cylinder is considerably greater than that of the live fluid admitted, difficulty has been experienced in providing sufficiently large exhaust ports when the exhaust portion of the valve has only the same movement as the inlet controlling portion.

The object of the present invention is to obviate these difficulties and provide a valve which, although positively controlling both inlet and exhaust ports, has an inlet portion which can be easily thrown by compression in the ends of the cylinder and which has comparatively slight movement and an exhaust controlling portion which is controlled by the motion of the inlet valve and has a considerably greater movement.

With this object in view I have devised a valve motion, a practical embodiment of which is shown in the accompanying drawings in which—

Figure 1:
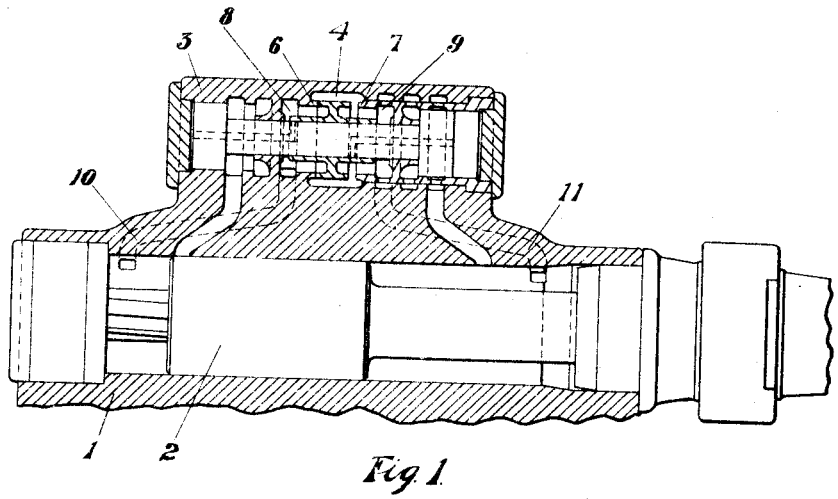
Figure 2:
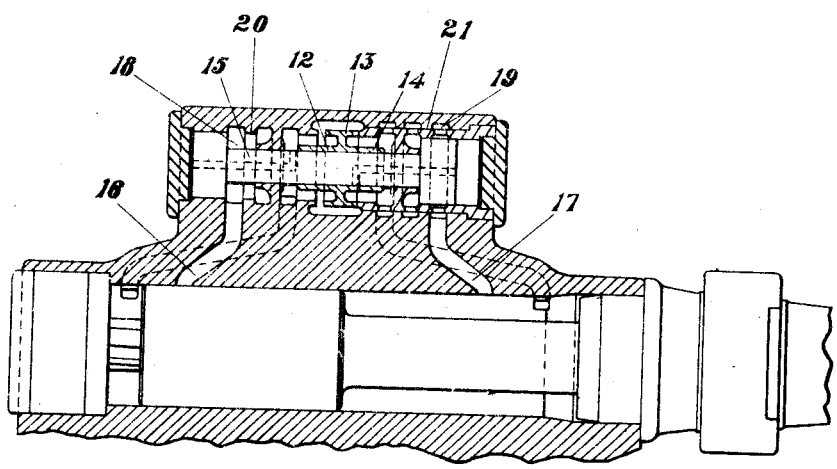
Figure 3:
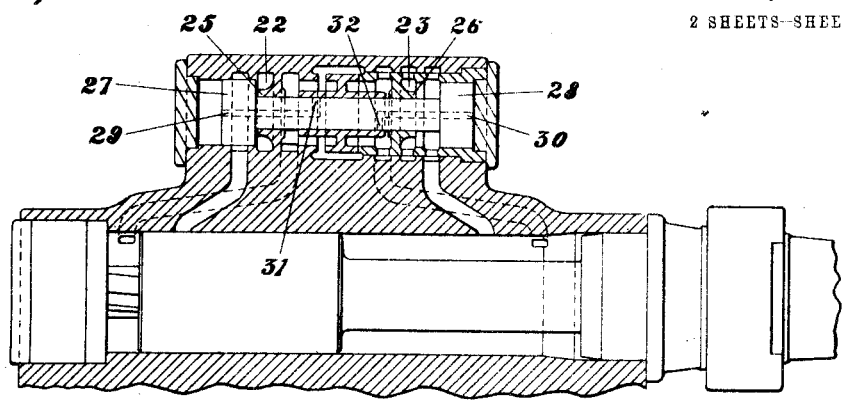
Figure 4:
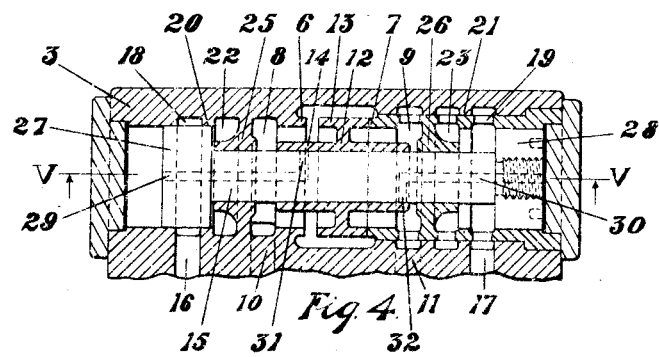
Figure 5:
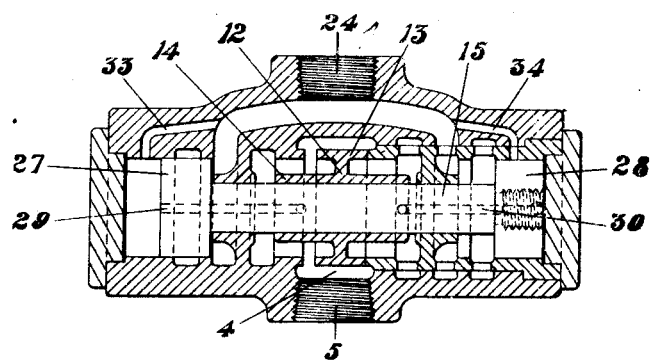

Figures 1 to 3 show a longitudinal section through the cylinder and valve chest with the valve and piston in various positions, Fig. 4 shows a similar section through the valve chest on a larger scale and Fig. 5 shows a horizontal section through the valve chest on the line 5—5 of Fig. 4.

The tool is shown in the drawings as a rock drill which comprises a cylinder 1 in which reciprocates a piston 2. On the upper side of the cylinder 1 is a valve chest 3, in the central part of which is a chamber 4 which is supplied with live fluid through an inlet passage 5. In the opposite ends of the inlet chamber 4 are the valve seats 6 and 7 through which fluid can be admitted to annular inlet ports 8 and 9 which communicate with the opposite ends of the drill cylinder by inlet passages 10 and 11. Controlling the passage of actuating fluid to these inlet passages is an inlet valve 12 comprising a flange portion 13 which is adapted to seat alternately against the valve seats 6 and 7, and a sleeve portion 14 attached to this flange 13 and extending in opposite directions therefrom. The sleeve portion 14 slides on and is supported by the shank 15 of the valve controlling the exhaust passages from the cylinder. These exhaust passages 16 and 17 lead from points in the cylinder nearer the middle respectively than the openings of the inlet passages 10 and 11 into annular chambers 18 and 19 near the ends of the valve chest 3. The chambers 18 and 19 are separated by flanges 20 and 21 from annular chambers 22 and 23 which communicate with the atmosphere through the passage 24, the chambers 22 and 23 being separated from the inlet chambers 8 and 9 by flanges 25 and 26 which form bearings for the shank 15 of the exhaust controlling valve. On the opposite ends of the shank 15 are heads 27 and 28 which alternately seat within the flanges 20 and 21 to cut off communication from the exhaust passages 16 and 17 to the exhaust passage 24. From the ends of the exhaust valve heads 27 and 28 fluid passages 29 and 30 run longitudinally along the center of the valve chest turning at right angles and opening into the inlet portion of the valve chest respectively at 31 and 32. These openings are so placed and the sleeve portion of the inlet valve 12 is of such a length that these openings will be uncovered and thus allow communication from the inlet chambers 8 and 9 to their respective ends of the valve chest only when the valve 12 and the valve 15 are at the opposite limits of their movements. Passages 33 and 34 lead from points near the ends of the valve chest to the exhaust passage 24 these passages serving to exhaust the ends of the valve chest and allow the exhaust valve to move.

In operation, supposing the parts to be in the position shown in Fig. 1, the actuating fluid is entering the front end of the cylinder through the inlet opening 5, chambers 4 and 9 and passage 11, driving the piston toward the back end of the cylinder. After the piston has passed the opening of the exhaust passage 16 on its backward stroke the actuating fluid remaining in the rear end of the cylinder, will be compressed by the further movement of the piston and when the pressure in the back end is greater than the pressure on the forward end of the flange 13 of the inlet valve, the inlet valve will be thrown forward into the position shown in Fig. 2. This will shut off the passage of the actuating fluid into the forward end of the cylinder and allow it to enter the rear end through the passage 10. At the same time by its movement to the right the sleeve portion 14 of the valve 12 will uncover the passage 31 allowing live fluid to pass through passage 29 to the rear of the exhaust valve head 27 and throw it forward into the position shown in Fig. 3, the fluid in the forward end of the valve chest in front of the exhaust valve head 28 exhausting through the passages 24 and 34 to the atmosphere. This movement of the exhaust valve will open the exhaust passage 17 to the atmosphere, through the chambers 19 and 23 and passage 24 allowing the piston to be moved forward by the live fluid back of it. When the piston on its forward stroke covers the exhaust passage 17 a similar cycle of operation will be repeated in the reverse direction throwing the valves again into the position shown in Fig. 1.

It is to be understood that the present showing and description discloses only one specified modification of my invention and other forms and modifications are included in the spirit and scope of the invention as expressed in the claims.

What I claim is:

1. In a percussive tool, a cylinder, its piston, inlet ports for each end of said cylinder, exhaust ports for each end of said cylinder, a valve for controlling said inlet ports and a separately moving valve for controlling said exhaust ports.

2. In a percussive tool, a cylinder, its piston, inlet passage to each end of said cylinder, exhaust passages from points nearer to middle of said cylinder than said inlet passage, a valve for controlling said inlet passage, said valve being operated by compression in the ends of the cylinder, and a separately moving valve for controlling said exhaust passages.

3. In a percussive tool, a cylinder, its piston, inlet passage to each end of said cylinder, exhaust passages from points nearer to middle of said cylinder than said inlet passage, a valve for controlling said inlet passage, said valve being operated by compression in the ends of the cylinder, and a separately moving valve for controlling said exhaust passages, said exhaust valve being controlled by the movement of said inlet valve.

4. In a percussive tool, a cylinder, its piston, inlet passages for each end of said cylinder, exhaust passages for each end of said cylinder, a compression operated valve for controlling said inlet passages, a live fluid operated valve for controlling said exhaust passages, and passages for conveying fluid to operate said exhaust valve, said passages being controlled by the movement of said inlet valve.

5. In a percussive tool, a cylinder, its piston, inlet passages for each end of said cylinder, exhaust passages for each end of said cylinder, a fluid operated valve for controlling said exhaust passages, passages for conveying fluid to opposed surfaces of said exhaust valve to operate said valve, and a fluid operated valve for controlling said inlet passages, said inlet valve having portions controlling the operating fluid conveying passages for said exhaust valve.

6. In a percussive tool, a cylinder, its piston, inlet passages for each end of said cylinder, exhaust passages for each end of said cylinder, a valve for controlling said inlet passages, and a valve for controlling said exhaust passages, said exhaust valve having a movement greater than said inlet valve.

7. In a percussive tool, a cylinder, its piston, inlet passages for each end of said cylinder, exhaust passages for each end of the cylinder, a fluid operated valve for controlling said inlet passages, and a separately moved fluid operated valve for controlling said exhaust passages, said exhaust valve having a movement greater than said inlet valve.

8. In a percussive tool, a cylinder, its piston, inlet passages for each end of said cylinder, exhaust passages for each end of said cylinder, a fluid operated valve for controlling said inlet passages, a fluid operated valve having a greater movement then said inlet valve, for controlling said exhaust passages, and passages for conveying fluid to operate said exhaust valve, said passages being controlled by said inlet valve.

9. In a percussive tool, a cylinder, its piston, inlet passages for each end of said cylinder, exhaust passages for each end of the cylinder, a valve for controlling said inlet passages, said inlet passages also serving to convey compression to throw said inlet valve, a valve for controlling said exhaust passages, said exhaust valve having a greater movement than said inlet valve, passage for conveying fluid to throw said exhaust valve, said passages being controlled by the movement of said inlet valve.

10. In a percussive tool, a cylinder, its piston, inlet passages for each end of said cylinder, exhaust passages for each end of said cylinder, a valve for controlling said exhaust passages having passages therethrough to opposed operating surfaces thereof, and a valve for controlling said inlet passages surrounding said exhaust valve and sliding thereon, and having portions controlling said passages through said exhaust valve.

11. In a percussive tool, a cylinder, its piston, inlet passages for each end of said cylinder, exhaust passages for each end of said cylinder, a valve for controlling said exhaust passages having passages therethrough to opposed operating surfaces thereof, and a valve for controlling said inlet passages surrounding said exhaust valve and sliding thereon, and having portions controlling said passages through said exhaust valve, said inlet valve being thrown by compression in the ends of the cylinder conveyed to said valve by said inlet passages.

In testimony whereof, I have hereunto set my hand.

CHARLES C. HANSEN.

Witnesses:
JOHN F. MOCK,
R. J. DAY,